(12) United States Patent
Solhusvik et al.

(10) Patent No.: US 7,683,305 B2
(45) Date of Patent: Mar. 23, 2010

(54) METHOD AND APPARATUS FOR AMBIENT LIGHT DETECTION

(75) Inventors: Johannes Solhusvik, Haslum (NO); Trygve Willassen, Oslo (NO); Ross Dermott, Los Angeles, CA (US); Michael Hartmann, Pasadena, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 0 days.

(21) Appl. No.: 11/905,094

(22) Filed: Sep. 27, 2007

(65) Prior Publication Data

US 2009/0084943 A1  Apr. 2, 2009

(51) Int. Cl.
*H01L 27/00* (2006.01)
*G01J 1/44* (2006.01)

(52) U.S. Cl. ................ 250/208.1; 250/214 AL
(58) Field of Classification Search ......... 250/208.1, 250/214 AL, 205, 206; 348/294–324, 208.12; 396/98; 382/274; 257/290, 291, 431–433
See application file for complete search history.

(56) References Cited

U.S. PATENT DOCUMENTS

| | | | |
|---|---|---|---|
| 4,490,036 A | 12/1984 | Anagnostopoulos | |
| 4,814,864 A * | 3/1989 | Pritchard | 348/227.1 |
| 4,847,483 A * | 7/1989 | Nishibe et al. | 250/214 AL |
| 5,543,889 A | 8/1996 | McIntyre | |
| 5,949,483 A * | 9/1999 | Fossum et al. | 348/303 |
| 5,950,037 A | 9/1999 | Ko | |
| 6,307,915 B1 | 10/2001 | Frojdh | |
| 6,320,616 B1 * | 11/2001 | Sauer | 348/241 |
| 6,379,013 B1 * | 4/2002 | Bechtel et al. | 359/604 |
| 6,469,289 B1 * | 10/2002 | Scott-Thomas et al. | 250/208.1 |
| 6,577,821 B2 | 6/2003 | Malloy Desormeaux | |
| 7,071,456 B2 | 7/2006 | Poplin | |
| 7,081,922 B2 | 7/2006 | Mentzer | |
| 7,256,379 B2 * | 8/2007 | Sugiyama et al. | 250/208.1 |
| 2002/0080246 A1 | 6/2002 | Parulski | |
| 2005/0041139 A1 | 2/2005 | Lowles | |
| 2005/0218303 A1 * | 10/2005 | Poplin | 250/214 AL |
| 2005/0219394 A1 | 10/2005 | Du et al. | |
| 2005/0249381 A1 | 11/2005 | Silvester et al. | |
| 2006/0044461 A1 | 3/2006 | Popescu-Stanesti et al. | |
| 2006/0164533 A1 | 7/2006 | Hsieh et al. | |

FOREIGN PATENT DOCUMENTS

| | | |
|---|---|---|
| JP | 2006-135909 | 5/2006 |
| WO | WO 97-01240 | 1/1997 |

(Continued)

OTHER PUBLICATIONS

Yusuke Oike et al., "A Pixel-Level Color Image Sensor with Efficient Ambient Light Suppression Using Modulated RGB Flashlight and Application to TOF Range Finding", Symposium on VLSI Circuits Digest of Tehcnical Papers, 2004.

(Continued)

*Primary Examiner*—Georgia Y Epps
*Assistant Examiner*—Jennifer Bennett
(74) *Attorney, Agent, or Firm*—Dickstein Shapiro LLP (57) ABSTRACT

An imaging method and apparatus which use a pixel array for capturing images and for measuring ambient light conditions.

31 Claims, 10 Drawing Sheets

FOREIGN PATENT DOCUMENTS

WO    WO 2006/111797    10/2006

OTHER PUBLICATIONS

J. Kramer, "An Integrated Optical Transient Sensor", *ICC Transactions on Circuits and Systems, Analog and Digitial Signal Processing*, vol. 49, No. 9, Sep. 2002.

Ram Chary et al., "Sensor-Based Power Management for Mobile Devices", The Computer Society, Proceedings of the 11th IEEE Symposium on Computers and Communications, 2006.

"The HP HDCS Family of CMOS Image Sensors" Hewlett Packard 1998.

* cited by examiner

METHOD AND APPARATUS FOR AMBIENT LIGHT DETECTION

FIELD OF THE INVENTION

Embodiments described herein relate generally to semiconductors and more particularly to imager devices.

BACKGROUND OF THE INVENTION

Many portable electronic devices, such as cameras, cellular telephones, Personal Digital Assistants (PDAs), MP3 players, computers, and other devices include a CMOS imaging device for capturing images. A CMOS imaging device includes a focal plane array of pixels, each one of the pixels including a photosensor, for example, a photogate, photoconductor or a photodiode overlying a substrate for accumulating photo-generated charge in the underlying portion of the substrate. Each pixel has a readout circuit that includes at least an output field effect transistor and a charge storage region connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imaging device, the active elements of a pixel perform the necessary functions of: (1) photon to charge conversion; (2) accumulation of image charge; (3) resetting the storage region to a known state; (4) transfer of charge to the storage region accompanied by charge amplification; (5) selection of a pixel for readout; and (6) output and amplification of a signal representing a reset level and pixel charge. Photo charge may be amplified when it moves from the initial charge accumulation region to the storage region. The charge at the storage region is typically converted to a pixel output voltage by a source follower output transistor.

Figure 1:
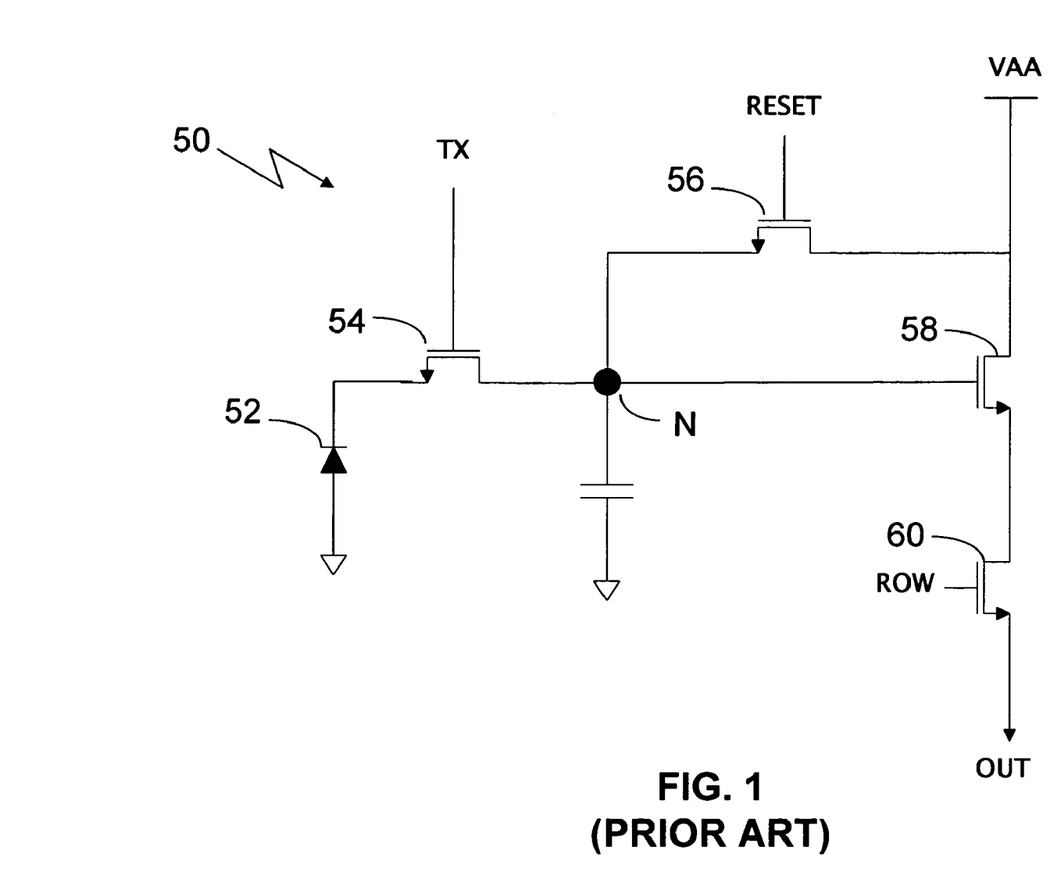
FIG. 1 illustrates a four transistor pixel for use in an array of an imaging device.

FIG. 1 illustrates a typical four transistor pixel 50 utilized in a pixel array of an imaging device, such as a CMOS imaging device. The pixel 50 includes a photosensor 52 (e.g., photodiode, photogate, etc.), a storage node configured as a floating diffusion region N, transfer transistor 54, reset transistor 56, source follower transistor 58 and row select transistor 60. The photosensor 52 is connected to the floating diffusion region N by the transfer transistor 54 when the transfer transistor 54 is activated by a transfer control signal TX. The reset transistor 56 is connected between the floating diffusion region N and an array pixel supply voltage VAA. A reset control signal RESET is used to activate the reset transistor 56, which resets the floating diffusion region N to a known state as is known in the art.

The source follower transistor 58 has its gate connected to the floating diffusion region N and is connected between the array pixel supply voltage VAA and the row select transistor 60. The source follower transistor 58 converts the charge stored at the floating diffusion region N into an electrical output signal. The row select transistor 60 is controllable by a row select signal ROW for selectively outputting the output signal OUT from the source follower transistor 58. For each pixel 50, two output signals are conventionally generated, one being a reset signal Vrst generated after the floating diffusion region N is reset, the other being an image or photo signal Vsig generated after charges are transferred from the photosensor 52 to the floating diffusion region N.

Figure 2:
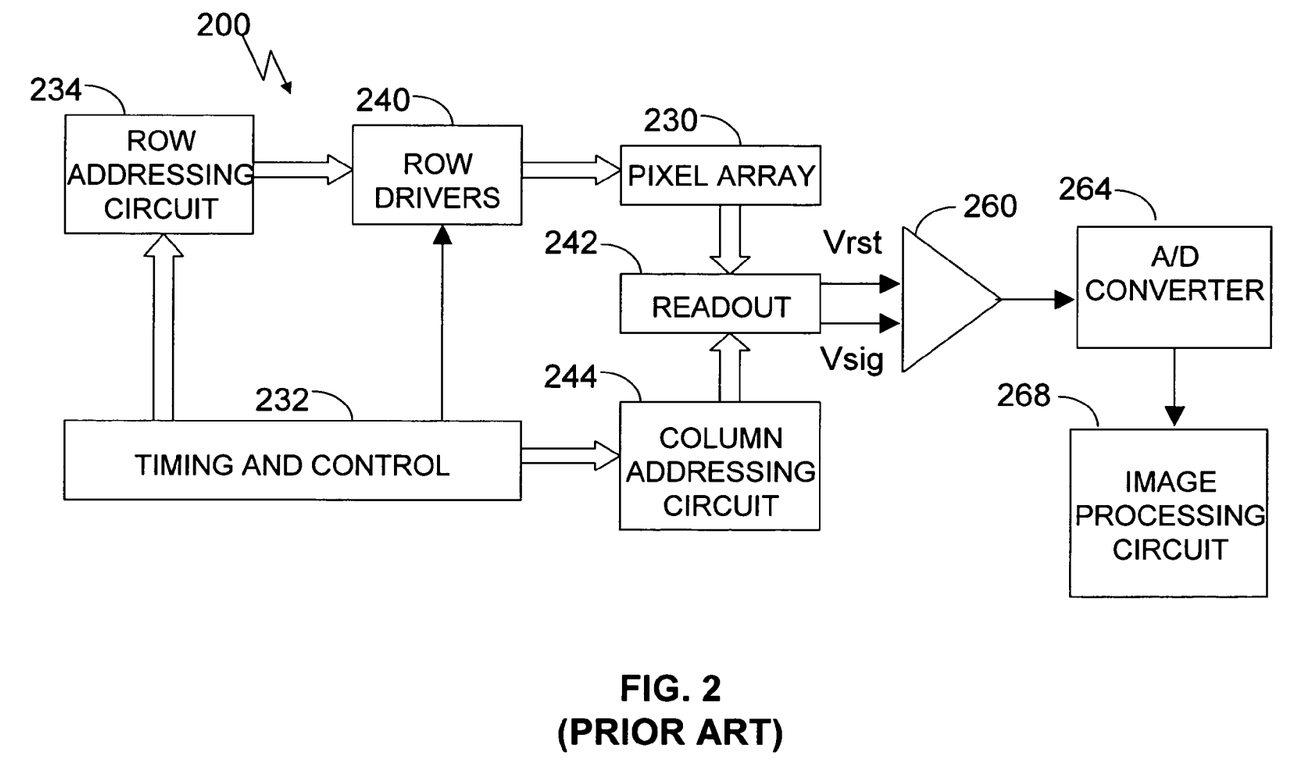
FIG. 2 is a block diagram of an imaging device.

FIG. 2 shows an imaging device 200 that includes an array 230 of pixels (such as the pixel 50 illustrated in FIG. 1) and a timing and control circuit 232. The timing and control circuit 232 provides timing and control signals for enabling the reading out of signals from pixels of the pixel array 230 in a manner commonly known to those skilled in the art. The pixel array 230 has dimensions of M rows by N columns of pixels, with the size of the pixel array 230 depending on a particular application.

Signals from the imaging device 200 are typically read out a row at a time using a column parallel readout architecture. The timing and control circuit 232 selects a particular row of pixels in the pixel array 230 by controlling the operation of a row addressing circuit 234 and row drivers 240. Signals stored in the selected row of pixels are provided to a readout circuit 242 in the manner described above. The signals read from each of the columns are then read out sequentially or in parallel using a column addressing circuit 244. The pixel signals (Vrst, Vsig) corresponding to the pixel reset signal and image pixel signal are provided as outputs of the readout circuit 242, and are typically subtracted in a differential amplifier 260 and the result digitized by an analog to digital converter to provide a digital pixel signal. The digital pixel signals represent an image captured by pixel array 230 and then are processed in an image processing circuit 268 to provide an output image.

Many of the portable electronic devices that include a CMOS imaging device, e.g., cameras, cell phones, PDA, etc., also include a display for presenting information to a user of the device. Electronic device displays, such as LCD screens, may include a backlight to illuminate the display and allow a user to view the display under low ambient light conditions. However, backlighting consumes a relatively large amount of power and may drain the battery of the portable electronic device.

To reduce power consumption, some portable electronic devices include a stand-alone ambient light detector, which detects the ambient light level and adjusts the brightness of the backlight accordingly. Although a stand-alone ambient light detector reduces power consumption of the backlight operation, a stand-alone ambient light detector itself uses power to continuously monitor ambient light. Furthermore, including both a CMOS imaging device for capturing images and an ambient light detector in a portable electronic device increases the costs and materials required to manufacture the device.

DETAILED DESCRIPTION OF THE INVENTION

In the following detailed description, reference is made to various embodiments that are described with sufficient detail to enable those skilled in the art to practice them. It is to be understood that other embodiments may be employed, and that various structural, logical and electrical changes may be made.

Various embodiments described herein relate to a method and system for integrated low power ambient light detection in imaging devices, in which an imaging device for capturing photo images is also used to detect and monitor ambient light conditions around an electronic device containing the imaging device. By using an imaging device, such as a CMOS imaging device, for ambient light detection rather than a stand-alone ambient light detector, the complexity and the cost of manufacturing the electronic device may be reduced. Furthermore, various embodiments discussed below include operating methods by which the imaging device further reduces power consumption at times other than when an image is being acquired.

Figure 3:
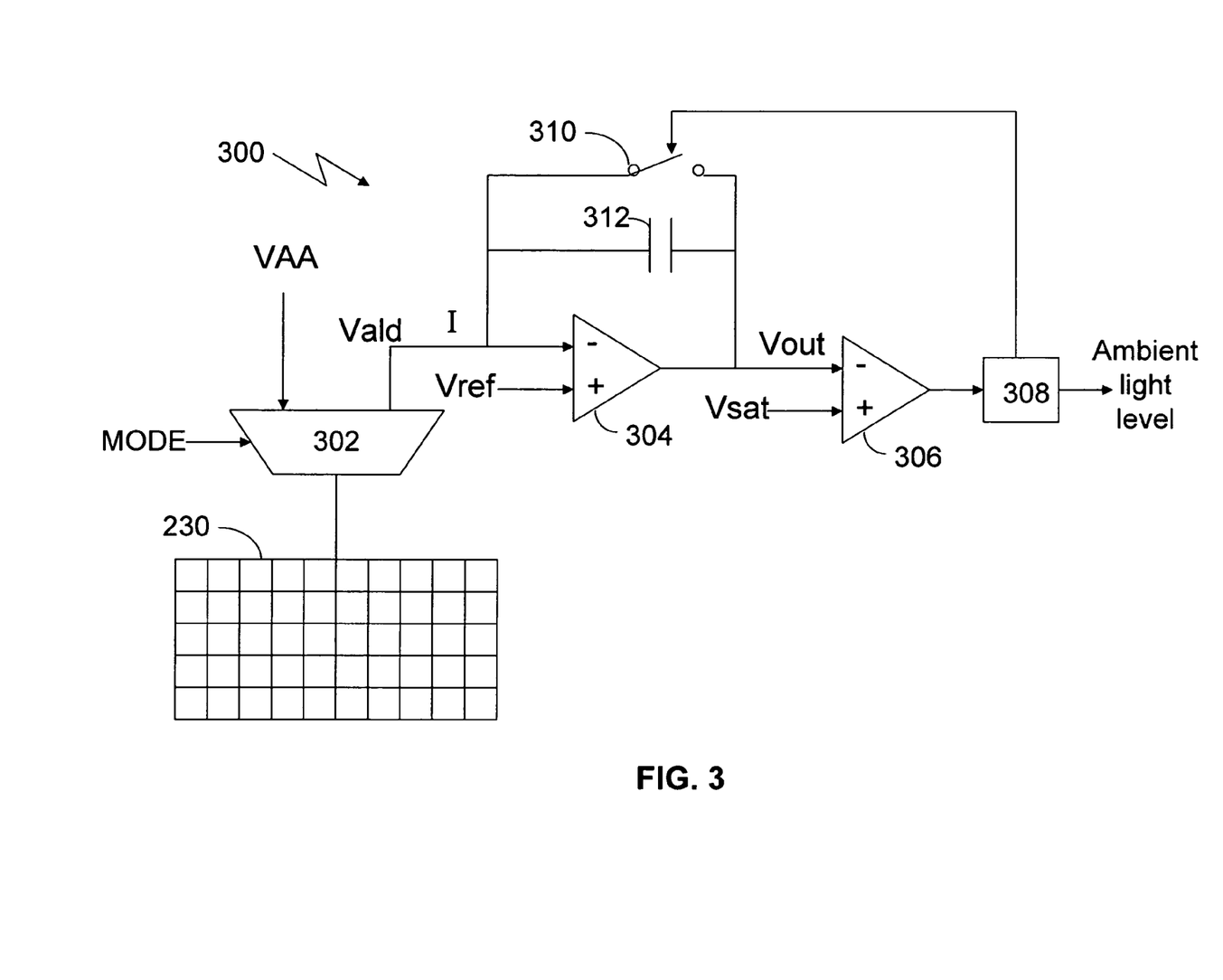
FIG. 3 is a diagram of an ambient light detecting circuit according to an embodiment described herein.

FIG. 3 shows an ambient light detecting circuit 300 to be used in conjunction with a pixel array 230 of an imaging device to detect ambient light conditions to which an electronic device is exposed. The ambient light detecting circuit 300 includes a multiplexer 302 and an integration circuit that includes a capacitor 312, a differential amplifier 304, and a reset switch 310. The ambient light detecting circuit 300 also includes a detection circuit that includes a comparator 306 and a control logic unit 308. In one embodiment, the ambient light detecting circuit 300 and the pixel array 230 may be integrated on the same die of the imaging device. Even if not included on the same die, the ambient light detecting circuit 300 is included as part of the imaging device circuitry.

The ambient light detecting circuit 300 may operate the pixel array 230 in two modes: a camera mode for obtaining photo images and an ambient light detection mode. When the pixel array 230 is operated in the camera mode, a mode control signal having a value representing camera mode is sent to the multiplexer 302 to cause the multiplexer 302 to provide the array pixel supply voltage VAA to the pixel array 230. The array pixel supply voltage VAA may be supplied, for example, from a power pad. VAA may be, for example, 2.8 V. The array pixel supply voltage VAA provides operating power for the pixel array 230 to capture an image in the manner described above with respect to FIGS. 1 and 2.

When the pixel array 230 is operated in the ambient light detection mode, a mode control signal having a value representing the ambient light detection mode is sent to the multiplexer 302 causing the multiplexer 302 to switch the voltage supplied to the pixel array 230 from VAA to the voltage Vald from the ambient light detection circuit 300.

At the beginning of the ambient light detection process, the reset switch 310 will be closed so that the reset switch 310 and differential amplifier 304 will act as a voltage follower circuit to cause Vald to be equal to the reference voltage Vref input to the differential amplifier 304. Vref is less than VAA so VAA, supplied to the pixel array 230, provides operating power to array 230 to detect the ambient light conditions using less power than is used to capture images. Vref may be, for example, 2.0 V. After the power supply lines to the pixel array 230 are (dc) biased to Vald, which equals Vref, the reset switch 310 is opened to begin the first ambient light detection cycle.

The pixels of pixel array 230 used to detect the ambient light conditions may then be activated by activating the TX and RESET control signals to the transfer transistor 54 and the reset transistor 56 (FIG. 1), respectively, to keep the transistors on or conducting. Rather than being read out by the source follower transistor 58, as it would be in image detection mode, the current collected by the photosensors 52 and floating diffusion regions N of the selected pixels will be continuously transferred from the pixels to the ambient light detecting circuit 300 through the multiplexer 302. The sum of the current I collected from the activated pixels represents the average light level falling on the selected pixels of the pixel array 230.

Figure 4:
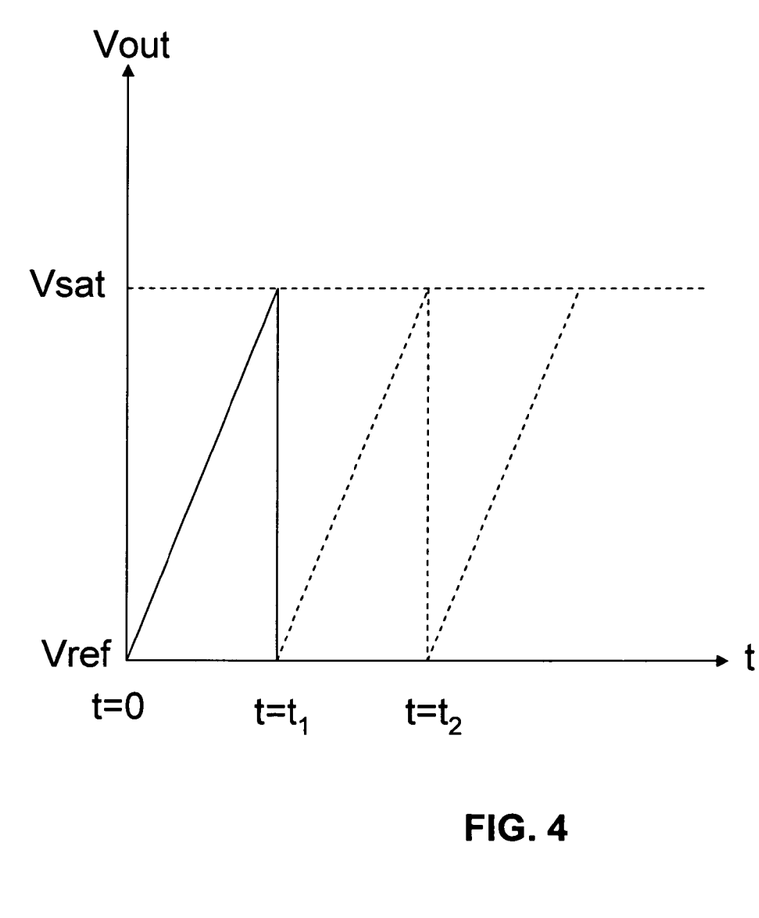
FIG. 4 is a diagram of the voltage level on a capacitor during operation of the ambient light detecting circuit.

The incoming current I from the pixel array 230 is integrated across capacitor 312, which drives up Vald. The differential amplifier 304 outputs the difference between Vref and Vald as Vout. Differential amplifier 304 ensures that the voltage Vald is close to Vref and the total current from the array is therefore forced onto the feedback capacitor 312 (charge integrator). FIG. 4 is a diagram of the voltage level of the voltage Vout during operation of the ambient light detecting circuit 300. At the beginning of the ambient light detection cycle, at t=0, Vald is equal to Vref and therefore Vout is equal to zero. As the current I from the pixel array 230 causes Vald to increase, Vout also increases. The speed at which Vout increases is directly proportional to the amount of ambient light impinging on the pixel array 230. Thus the output voltage of the differential amplifier 304 (Vout) will increase in a linear manner over time with positive slope I_array/C_312. Eventually, at $t=t_1$, Vout will be equal to the saturation reference voltage Vsat input to comparator 306. The comparator 306 determines when Vout equals Vsat and sends a signal to the logic unit 308. When the logic unit 308 receives the signal from the comparator that Vout equals Vsat, the logic unit 308 closes the reset switch 310 to short out the charge on the capacitor 312 and reset the voltages Vald and Vout to Vref and re-start the integration of pixel array 230. The resetting of the voltages ends the first ambient light detection cycle shown between t=0 and $t=t_1$.

To begin the next ambient light detection cycle, the reset switch 310 is opened again, allowing the voltages Vald and Vout to rise again based on the current I generated by the pixel array 230. This cycle repeats in the same manner as the previous cycle, with the voltage Vout rising until Vout equals Vsat, and the charge on the capacitor 312 is shorted again by closing the switch 310 at $t=t_2$.

Figure 8:
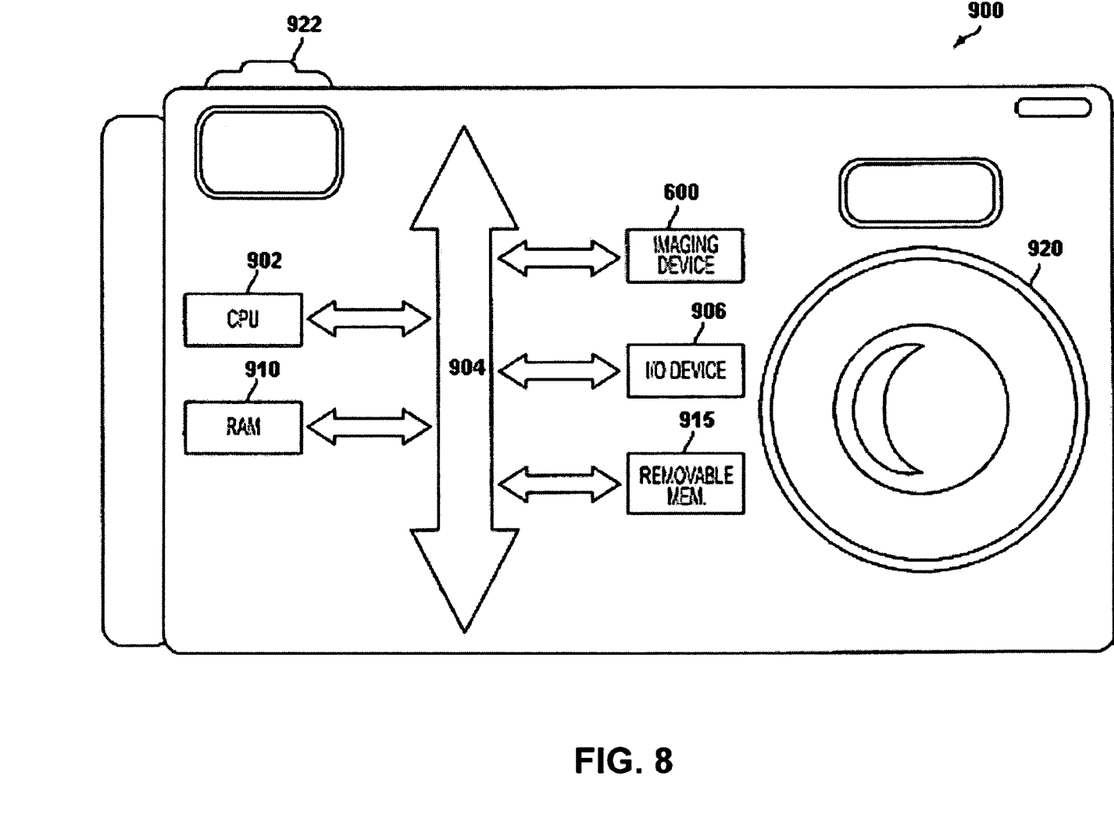
FIG. 8 is a block diagram of a processor system according to an embodiment described herein.

The length of a cycle, e.g., $t_0$ to $t_1$, is proportional to the amount of ambient light impinging on the pixels of the pixel array 230, because more light generates more current I, which is integrated faster by the differential amplifier 304 and the capacitor 312. Therefore, the amount of ambient light may be determined by measuring the cycle time, i.e., the time that it takes Vout to equal Vsat (i.e., the time between $t_0$ and $t_1$, for example). Alternatively, an average cycle time may be computed over a number of cycles. The length of the cycle time may be measured and converted into a digital value by various means, for example, the control logic unit 308 may include a timer and/or a counter to measure the cycle frequency and/or average cycle frequencies. For example, a counter within logic unit 308 can start counting a clock signal at to and stop counting at $t_1$. The count value represents the amount of ambient light. The control logic unit 308 may then output a signal that represents the amount of ambient light or may be correlated to the amount of ambient light by a digital circuit, for example, a device controlled by CPU 902 (FIG. 8) using a look-up table stored in a memory unit 915 (FIG. 8).

In one embodiment, all pixels in the pixel array 230 are used to detect ambient light by activating their respective transfer transistors 54 and reset transistors 56. In another embodiment, only a selected number of pixels in the pixel array 230 are enabled to conserve power. The selected number of pixels may include one or more rows and/or columns, a sampling of pixels located throughout the array, or a sub-array of contiguous pixels. The selected pixels may be within a defined group of pixels within the pixel array 230. Of course, other arrangements of pixels may also be used.

In another embodiment, the pixels used to detect ambient light may be activated by only providing a RESET signal to the reset transistor 56 and leaving the transfer transistor 54 off. In this case, current I will only be produced by the floating diffusion regions N of the selected pixels. The floating diffusion regions N serve as photodetectors in this case. This allows for even smaller photocurrents and may conserve more energy. The would be beneficial, for example, when the ambient light detection mode is used to maintain a standby mode in an electronic device.

Figure 5:
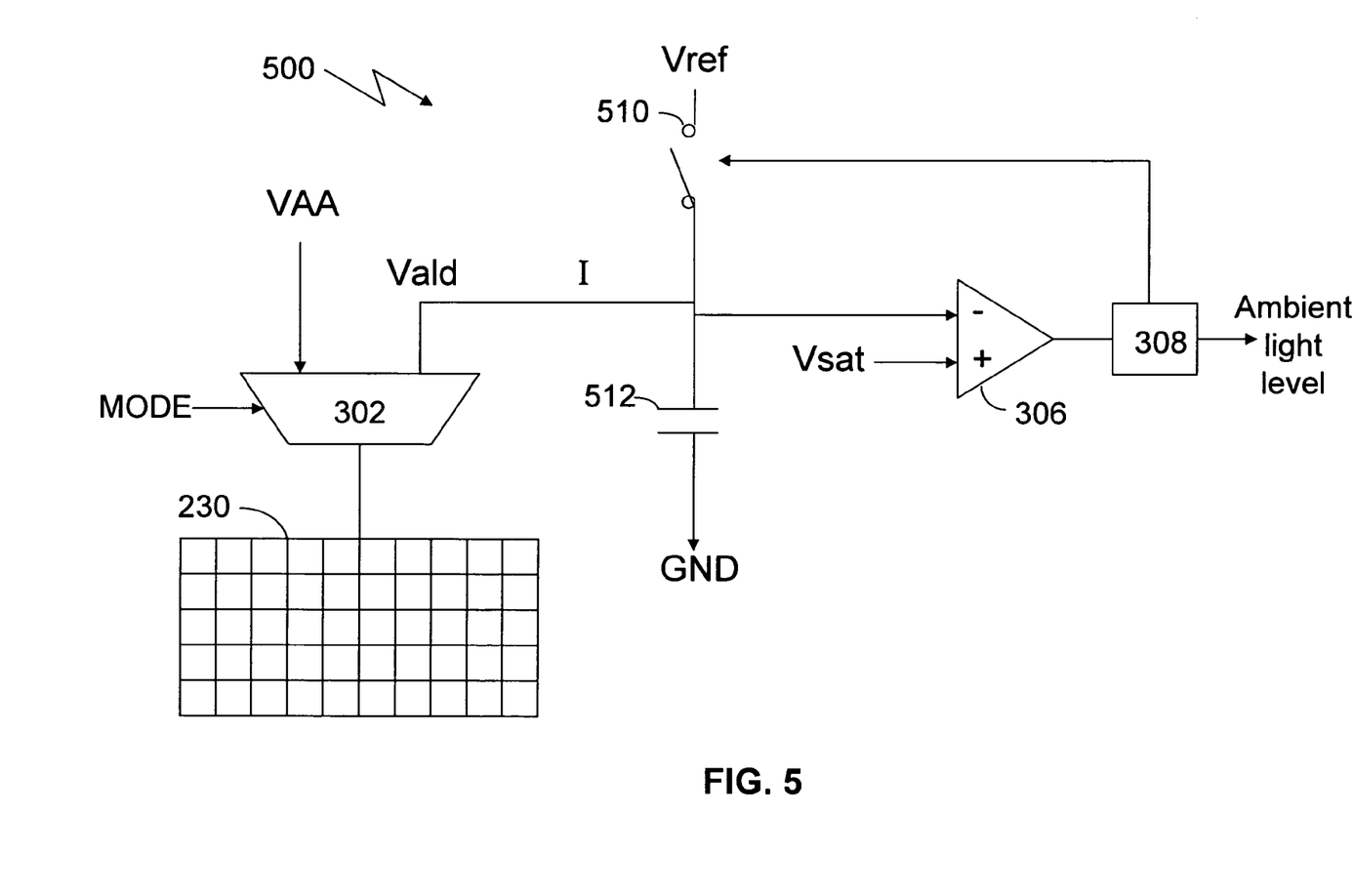
FIG. 5 is a diagram of an ambient light detecting circuit according to an embodiment described herein.

FIG. 5 is a diagram of an ambient light detecting circuit 500 according to another embodiment. The ambient light detecting circuit 500 includes a multiplexer 302 and an integration circuit that includes a capacitor 512, and a reset switch 510. The ambient light detecting circuit 300 also includes a detection circuit that includes a comparator 306 and a control logic unit 308. The capacitor 512 is connected to a ground potential GND.

Figure 6:
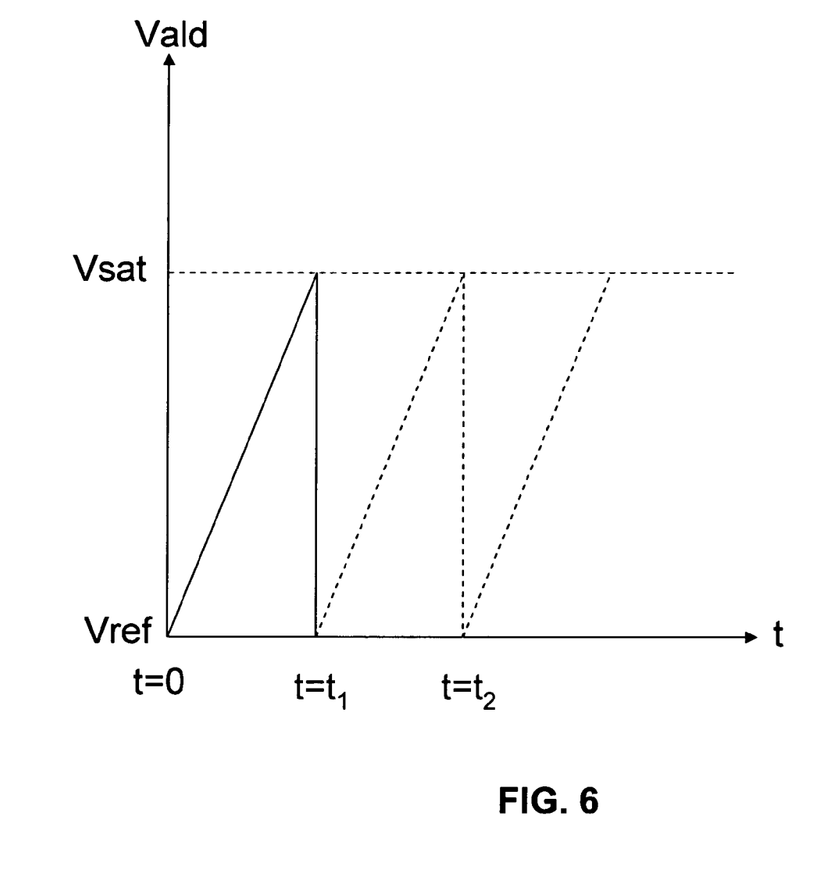
FIG. 6 is a diagram of the voltage level on a capacitor during operation of the ambient light detecting circuit.

The method of operating the ambient light detecting circuit 500 is now described with reference to FIGS. 5 and 6. FIG. 6 depicts the voltage Vald during operation of the ambient light detecting circuit 500. To being an ambient light detection cycle, the reset switch 510 is closed and the reference voltage Vref is supplied to the multiplexer 302 at Vald. At the beginning of a cycle, $t=0$, the reset switch 510 is opened and the current I, provided by the selected pixels from the pixel array 230 with the reset transistor 56 or reset transistor 54 and transfer transistor 56 turned on, is integrated across the capacitor 512 to increase the voltage Vald. When Vald is equal to the saturation reference voltage Vsat, at $t=t_1$, the comparator 306 signals the control logic unit 308 to close the reset switch 510 and return the voltage on the capacitor 512 and Vald to Vref. The control logic unit 308 then opens the reset switch 510 when Vout equals Vref to end the first cycle. The next cycle begins and the process then repeats. As in the FIG. 3 embodiment, control logic circuit 308 includes a timer and/or counter to measure the cycle frequency and/or average cycle frequency and provides an output signal representing the amount of ambient light that was detected.

Figure 9:
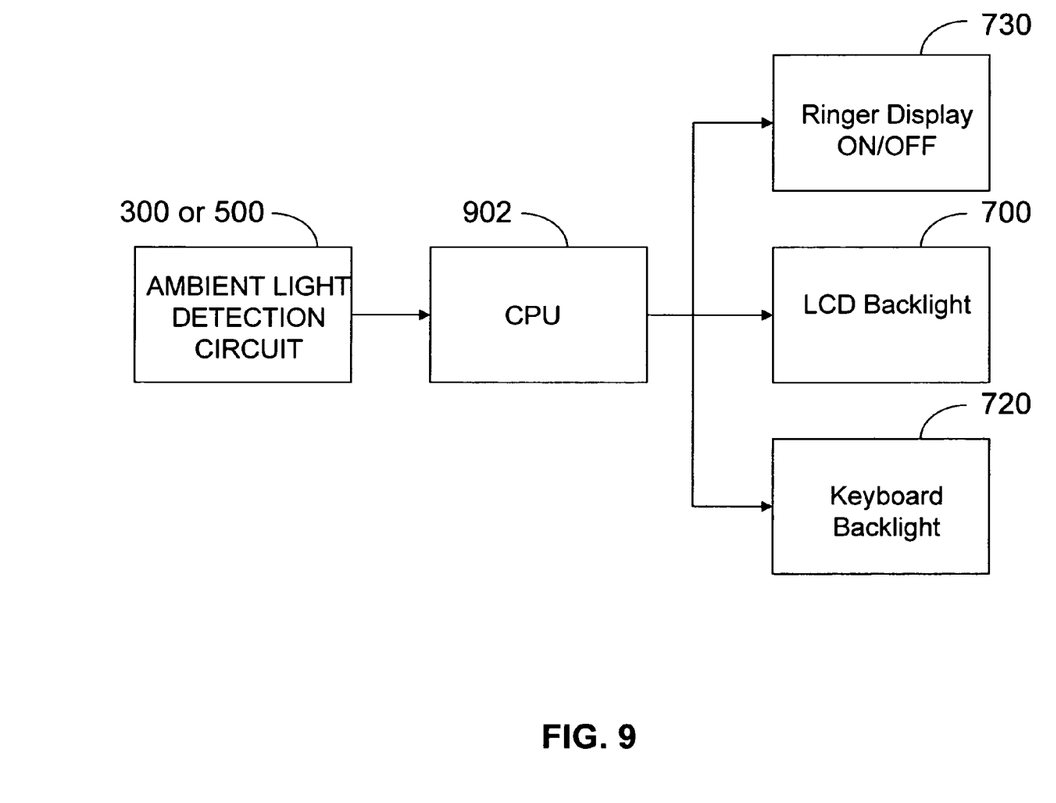
FIG. 9 is a block diagram of a processor system to control input/output devices according to an embodiment described herein.

The various embodiments of the ambient light detecting circuits 300, 500 have a variety of applications. For example, one application may be a camera phone in which the camera host processor, e.g. CPU 902 (FIG. 8), can use the ambient light data to control the brightness of a backlight for an LCD screen 700, or for a back lit key board 702 as shown in FIG. 9. The backlight can be similarly controlled in electronic device such as laptop computers, digital still cameras, and other electronic devices where power consumption is critical.

Figure 10:
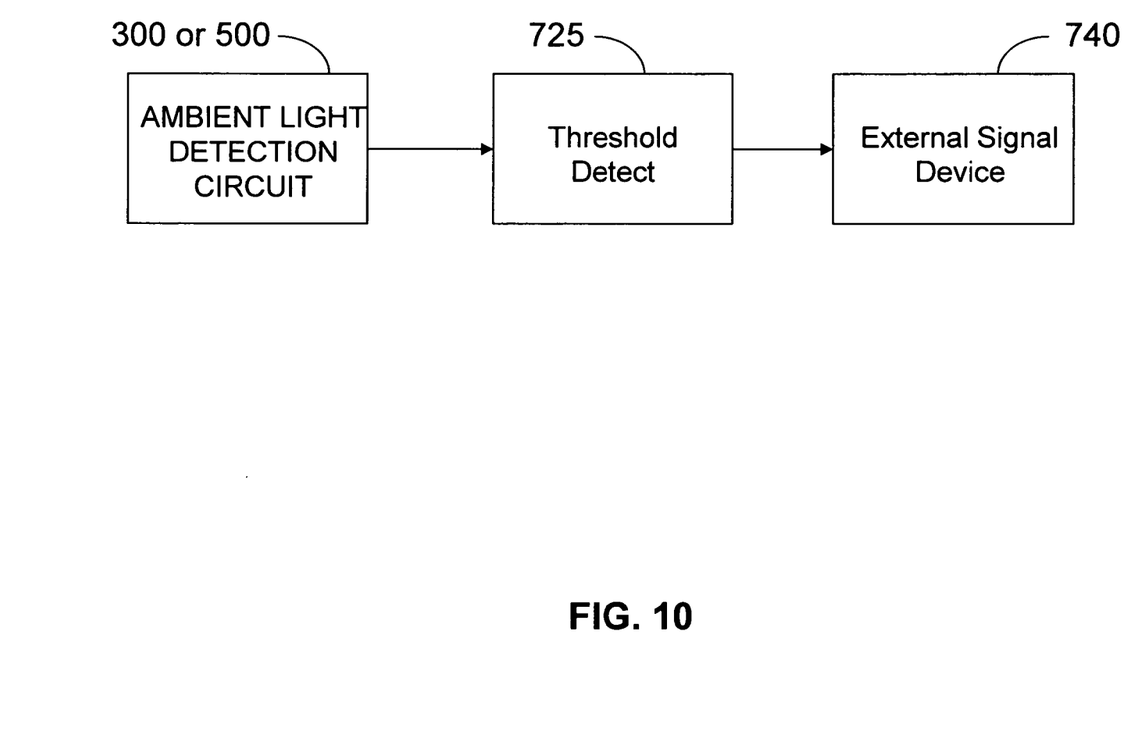
FIG. 10 is a block diagram of a processor system to detect an ambient light threshold according to an embodiment described herein.

Another application uses the ambient light detecting circuit 300, 500 to trigger an external audio or visual signal when a high or low threshold is met as sensed by a threshold detector 725, such as when the ambient light is too high or too low to obtain a photo image, as shown in FIG. 10. The ambient light detecting circuit could also be used to shut off a display and/or ringer 730 on a cellular phone when light is being blocked by a user's face during use or by a surface when the phone is placed face down, as illustrated in FIG. 9. This ambient light mode could also be used in notebook cameras for laptops, and digital still cameras. Because digital still cameras only use the mechanical shutter during image capture, the shutter remains open for preview which would still allow the ambient light detecting circuit to function properly.

Another application for the ambient light detecting circuit is for use in image acquisition to determine ambient light levels. For example, an imager device can use the ambient light level as an input to timing and control circuit 232, analog signal processing circuits, e.g. 260 and other amplifiers, and image processing circuit 268 for gross changes in exposure values, flash control, and automatic white balance. By having immediate data for gross changes, fast wake-up times when the imager device comes out of standby mode may be achieved. Early image processing can be further enhanced by including a dark row in the sub-array that is accessible in the ambient light detection mode. Dark row data can also be used to determine information about temperature.

Figure 7:
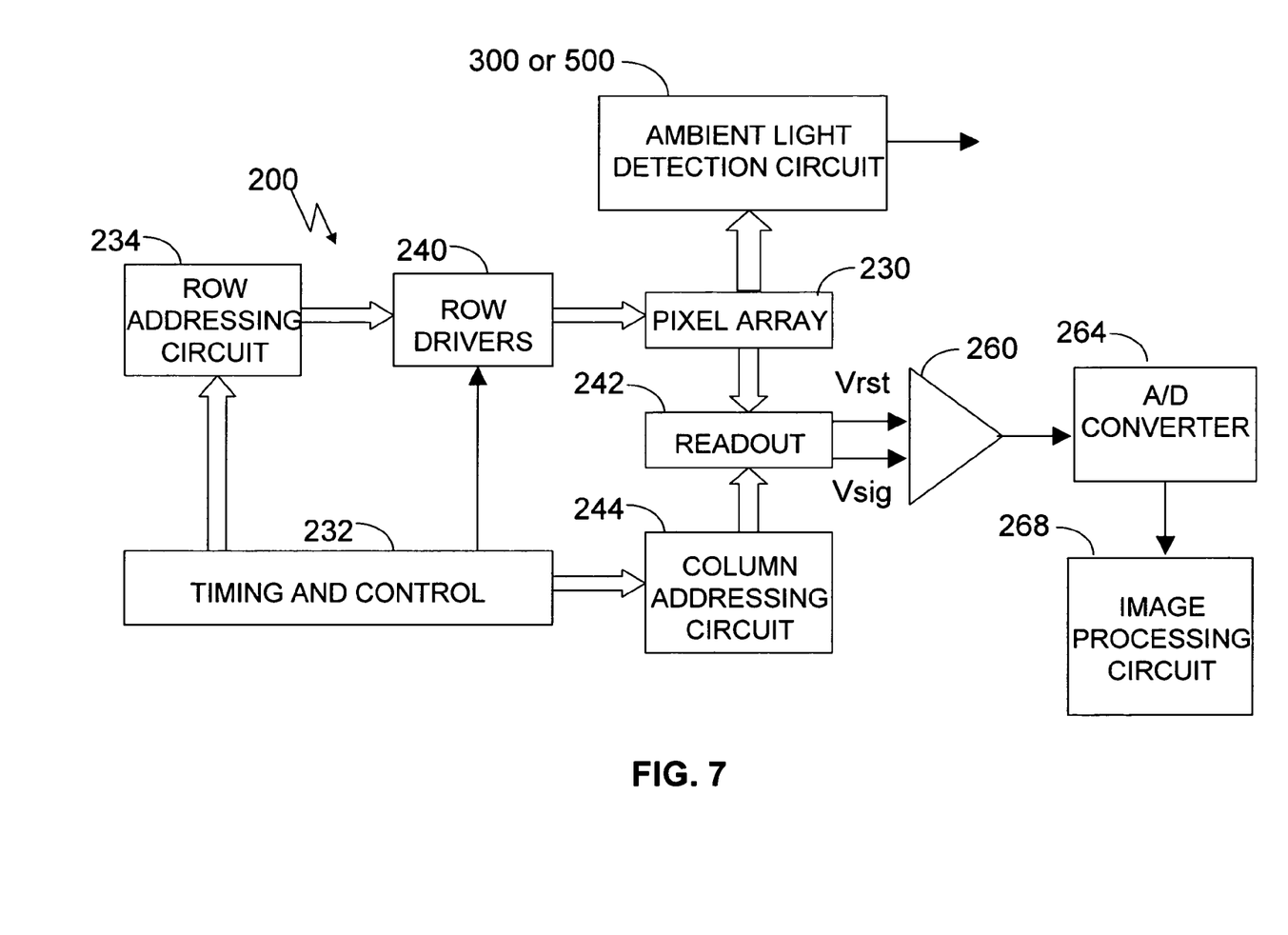
FIG. 7 is a block diagram of an imaging device according to an embodiment described herein.

FIG. 7 shows an imaging device 600 that includes an ambient light detection circuit 300 or 500, an array 230 of pixels (such as the pixel 50 illustrated in FIG. 1) and a timing and control circuit 232. The imaging device 600 operates during an image acquisition mode in the manner described above with respect to FIG. 2. In addition, the ambient light detection circuit 300 or 500 provides a signal representing detected ambient light during an ambient light detection mode.

FIG. 8 shows a typical processor system 900 modified to include an imaging device 600 constructed and operated in accordance with an embodiment. The processor system 900 is a system having digital circuits that could include imaging devices. Without being limiting, such a system could include a computer system, camera system, scanner, machine vision, vehicle navigation, video phone, surveillance system, auto focus system, star tracker system, motion detection system, image stabilization system, or other image acquisition system.

System 900, for example a digital still or video camera system, generally comprises a central processing unit (CPU) 902, such as a control circuit or microprocessor for conducting camera functions, that communicates with one or more input/output (I/O) devices 906 over a bus 904. Imaging device 600 also communicates with the CPU 902 over the bus 904. The processor system 900 also includes random access memory (RAM) 910, and can include removable memory 915, such as flash memory, which also communicate with the CPU 902 over the bus 904. The imaging device 600 may be combined with the CPU processor with or without memory storage on a single integrated circuit or on a different chip than the CPU processor. In a camera system, a lens 920 is used to focus light onto the imaging device 600 when a shutter release button 922 is pressed. The ambient light detection signal from imaging device 600 can be provided to the system CPU 902 for various control purposes, including those described above.

In one embodiment, the system 900 is a device, such a digital camera, that has an LCD screen and/or a lighted key pad as I/O devices 906, shown more specifically as 700 and 720 in FIG. 9. The CPU 902 may then use the ambient light detection signal to control the back light of the LCD screen and/or the light that illuminates the key pad to make the LCD screen and/or keypad brighter or darker as required for viewing by a user.

In another embodiment, the CPU 902 of the system 900 may use the ambient light detection signal to revive the CPU 902 from a stand-by mode when the ambient light detection signal increases, such as when a cover of a device such as a cell phone or laptop computer is opened and the imaging device 600 is exposed to light.

The above description and drawings are only to be considered illustrative of specific embodiments, which achieve the features and advantages described herein. Modification and substitutions to specific structures can be made. Accordingly, the embodiments are not to be considered as being limited by the foregoing description and drawings, but are only limited by the scope of the appended claims.

What is claimed as new and desired to be protected by Letters Patent of the United States is:

1. An imaging device, comprising:
    a pixel array comprising a plurality of pixels, wherein the plurality of pixels each comprise a photosensor, a floating diffusion node, a transfer transistor for transferring charge from the photosensor to the floating diffusion node, and a reset transistor for resetting the floating diffusion node;
    an ambient light detection circuit connected to the array and comprising:
        a capacitor for storing charge generated by at least some pixels of the pixel array, and
        a voltage control circuit for providing a first voltage on said capacitor prior to said charge storage, and for measuring the time for said voltage on said capacitor to rise from said first voltage to a second voltage in response to said stored charge generated by said at least some pixels; and
    a timing and control circuit for turning on the reset transistor of at least some of the pixels to transfer charge from the floating diffusion nodes to the capacitor.

2. The imaging device of claim 1, wherein the voltage control circuit comprises:
    a differential amplifier for outputting the difference between the first voltage and the voltage on the capacitor;
    a comparator for determining when the output of the differential amplifier is equal to the second voltage;
    a switch connected in parallel with the capacitor for resetting the charge on the capacitor to the first voltage when the switch is closed; and
    a control logic unit for closing and then opening the switch when the output of the differential amplifier is equal to the second voltage and for measuring the amount of time it takes for the output of the differential amplifier to equal the second voltage after the switch is opened.

3. The imaging device of claim 2, wherein said control logic unit is configured to calculate an average amount of time it takes for the output of the differential amplifier to equal the second voltage over a plurality of cycles of the capacitor voltage rising from the first voltage to the second voltage.

4. The imaging device of claim 1, wherein the voltage control circuit comprises:
    a comparator for determining when the voltage on the capacitor is equal to a second voltage;
    a switch connected in series with the capacitor for resetting the charge on the capacitor to the first voltage when the switch is closed; and
    a control logic unit for closing the switch when the voltage on the capacitor is equal to the second voltage and for measuring the amount of time it takes for the voltage on the capacitor to move from the first voltage to the second voltage.

5. The imaging device of claim 4, wherein said control logic unit is configured to calculate an average amount of time it takes for the voltage on the capacitor to move from the first voltage to the second voltage over a plurality of cycles of such movement.

6. The imaging device of claim 1, further comprising a switch circuit for supplying an operating voltage to the pixel array during an image capture mode and for supplying the first voltage to the pixel array to detect an amount of ambient light during a light detection mode, wherein the first voltage is different from the operating voltage.

7. The imaging device of claim 1, wherein the control logic unit is configured to output a signal that is representative of the amount of ambient light impinging on the pixel array.

8. The imaging device of claim 7, wherein the imaging device is part of an imaging system which further comprises a display unit having a light and a processing unit for controlling the brightness of the light according to the signal output by the control logic unit.

9. The imaging device of claim 1, wherein the capacitor stores charge generated by less than all pixels of the pixel array.

10. An imaging device comprising:
    a pixel array comprising a plurality of pixels; and
    an ambient light detection circuit connected to the array and, comprising:
        an integration circuit for integrating charge produced by at least some pixels of the pixel array, the integration circuit comprising:
            a capacitor for storing the charge produced by said at least some pixels, and
            a switch connected in series with the capacitor for resetting the charge on the capacitor to a first voltage when the switch is closed; and
        a detection circuit for determining an ambient light level based on charge integrated by said integration circuit.

11. The imaging device of claim 10
wherein the detection circuit comprises:
    a comparator for determining when the output of the capacitor is equal to a second voltage, and
    a control logic unit for closing and then opening the switch when the output of the capacitor is equal to the second voltage and for measuring the amount of time it takes for the output of the capacitor to equal the second voltage after the switch is opened.

12. The imaging device of claim 10, further comprising a switch circuit for supplying an operating voltage to the pixel array during an image capture mode and for supplying a first voltage to the pixel array to detect an amount of ambient light during a light detection mode, wherein the first voltage is different from the operating voltage.

13. A method of measuring an amount of ambient light impinging on a pixel array, comprising:
    integrating voltage on a capacitor representing a collective current generated by at least some pixels of the pixel array;
    measuring the time it takes the voltage on the capacitor to increase from a first voltage to a second voltage; and
    using said measurement to determine an amount of ambient light impinging on said at least some pixels.

14. The method of claim 13, further comprising supplying an operating voltage to said at least some pixels during an image capture mode and supplying the first voltage to said at least some pixels during an ambient light detection mode, wherein the first voltage is different from the operating voltage.

15. The method of claim 13, further comprising resetting the charge on the capacitor to the first voltage when the voltage on the capacitor equals the second voltage.

16. The method of claim 13, further comprising calculating an average time it takes the voltage on said capacitor to increase from the first operating voltage to the second voltage over a number of cycles in which the voltage on the capacitor increases from said first voltage to said second voltage.

17. The method of claim 13, wherein the current generated by the pixel array comprises current generated by less than all pixels in the pixel array.

18. The method of claim 13, further comprising comparing the voltage on the capacitor to the second voltage using a comparator.

19. The method of claim 13, wherein each of said plurality of pixels comprises a photosensor, a floating diffusion node, a transfer transistor for transferring charge from the photosensor to the floating diffusion node, and a reset transistor for resetting the floating diffusion node, and wherein the method further comprises turning on the reset transistor and the transfer transistor to transfer charge generated by the photosensor to the capacitor.

20. The method of claim 13, wherein each of said plurality of pixels comprises a floating diffusion node, and a reset transistor for resetting the floating diffusion node, and wherein the method further comprises turning on the reset transistor to transfer charge generated by the floating diffusion node to the capacitor.

21. An imaging system comprising:
a lighted display unit for displaying information;
a control circuit for controlling the brightness of said lighted display unit using a signal representing the ambient light the imaging system is exposed to; and
an imaging device, comprising:
a pixel array containing a plurality of pixels, and
an ambient light detection circuit connected to the array for outputting the signal representing the ambient light, the ambient light detection circuit comprising:
a capacitor for storing charge commonly generated by at least some pixels of the pixel array, and
a voltage control circuit comprising,
a multiplexer for supplying an operating voltage to the pixel array during an image capture mode and for supplying a first voltage to the pixel array to detect an amount of ambient light during a light detection mode;
a differential amplifier for outputting the difference between the first voltage and the voltage on the capacitor;
a comparator for determining when the output of the differential amplifier is equal to a second voltage;
a switch connected in parallel with the capacitor for resetting the charge on the capacitor to the first voltage when the switch is closed; and
a control logic unit for closing the switch when the output of the differential amplifier is equal to the second voltage, for measuring an average amount of time it takes for the output of the differential amplifier to equal the second voltage, and for outputting the signal representing an amount of detected ambient light.

22. An imaging system comprising:
a lighted display unit for displaying information;
a control circuit for controlling the brightness of said lighted display unit using a signal representing the ambient light the imaging system is exposed to; and
an imaging device, comprising a pixel array containing a plurality of pixels and an ambient light detection circuit connected to the array for outputting the signal representing the ambient light, the ambient light detection circuit comprising:
a capacitor for storing charge commonly generated by at least some pixels of the pixel array, and
a voltage control circuit comprising,
a multiplexer for supplying an operating voltage to the pixel array during an image capture mode and for supplying a first voltage to the pixel array to detect an amount of ambient light during a light detection mode;
a comparator for determining when the voltage on the capacitor is equal to a second voltage;
a switch connected in series with the capacitor for resetting the charge on the capacitor to the first voltage when the switch is closed; and
a control logic unit for closing the switch when the voltage on the capacitor is equal to the second voltage, and for measuring an average amount of time it takes for the voltage on the capacitor to equal the second voltage, and for outputting the signal representing the ambient light.

23. An imaging device, comprising:
a pixel array comprising a plurality of pixels, wherein the plurality of pixels each comprise a photosensor, a floating diffusion node, a transfer transistor for transferring charge from the photosensor to the floating diffusion node, and a reset transistor for resetting the floating diffusion node;
an ambient light detection circuit connected to the array and comprising:
a storage device for storing charge generated by at least some pixels of the pixel array, and
a voltage control circuit for providing a first voltage on said storage device prior to said charge storage, and for measuring the time for said voltage on said storage device to rise from said first voltage to a second voltage in response to said stored charge generated by said at least some pixels; and
a timing and control circuit for turning on the reset transistor of at least some of the pixels to transfer charge from the floating diffusion nodes to the storage device.

24. The imaging device of claim 23, wherein the voltage control circuit comprises:
a differential amplifier for outputting the difference between the first voltage and the voltage on the storage device;
a comparator for determining when the output of the differential amplifier is equal to the second voltage;
a switch connected in parallel with the storage device for resetting the charge on the storage device to the first voltage when the switch is closed; and
a control logic unit for closing and then opening the switch when the output of the differential amplifier is equal to the second voltage and for measuring the amount of time it takes for the output of the differential amplifier to equal the second voltage after the switch is opened.

25. The imaging device of claim 24, wherein said control logic unit is configured to calculate an average amount of time it takes for the output of the differential amplifier to equal the second voltage over a plurality of cycles of the storage device voltage rising from the first voltage to the second voltage.

26. The imaging device of claim 23, wherein the voltage control circuit comprises:
a comparator for determining when the voltage on the storage device is equal to a second voltage;

a switch connected in series with the storage device for resetting the charge on the storage device to the first voltage when the switch is closed; and a control logic unit for closing the switch when the voltage on the storage device is equal to the second voltage and for measuring the amount of time it takes for the voltage on the storage device to move from the first voltage to the second voltage.

27. The imaging device, of claim 26, wherein said control logic unit is configured to calculate an average amount of time it takes for the voltage on the storage device to move from the first voltage to the second voltage over a plurality of cycles of such movement.

28. The imaging device of claim 23, further comprising a switch circuit for supplying an operating voltage to the pixel array during an image capture mode and for supplying the first voltage to the pixel array to detect an amount of ambient light during a light detection mode, wherein the first voltage is different from the operating voltage.

29. The imaging device of claim 23, wherein the control logic unit is configured to output a signal that is representative of the amount of ambient light impinging on the pixel array.

30. The imaging device of claim 29, wherein the imaging device is part of an imaging system which further comprises a display unit having a light and a processing unit for controlling the brightness of the light according to the signal output by the control logic unit.

31. The imaging device of claim 23, wherein the storage device stores charge generated by less than all pixels of the pixel array.

* * * * *

UNITED STATES PATENT AND TRADEMARK OFFICE
CERTIFICATE OF CORRECTION

PATENT NO. : 7,683,305 B2
APPLICATION NO. : 11/905094
DATED : March 23, 2010
INVENTOR(S) : Johannes Solhusvik et al.

It is certified that error appears in the above-identified patent and that said Letters Patent is hereby corrected as shown below:

In the References Cited:

Page 1, Column 2, Other Publications, Yusuke Oike et al., "'A Pixel-Level Color Image Sensor with Efficient Ambient Light Suppression Using Modulated RGB Flashilight and Application to TOF Range Finding', Symposium on VLSI Circuits Digest of Tehcnical Papers, 2004" should read --"A Pixel-Level Color Image Sensor with Efficient Ambient Light Suppression Using Modulated RGB Flashlight and Application to TOF Range Finding", Symposium on VLSI Circuits Digest of Technical Papers, 2004--.

Page 2, Column 1, Other Publications, J. Kramer, "*Analog Digitial Signal Processing*" should read --Analog Digital Signal Processing--.

In the Specification:

Column 4, lines 63-64, "start counting a clock at signal to and stop counting at $t_1$" should read --start counting a clock at signal $t_0$ and stop counting at $t_1$--.

Column 5, lines 34-36, "To being an ambient light detection cycle, the reset switch 510 is closed and the reference voltage Vref is supplied to the multiplexer 302 at Vald" should read --To begin an ambient light detection cycle, the reset switch 510 is closed and the reference voltage Vref is supplied to the multiplexer 302 at Vald--.

Column 5, lines 58-60, "The backlight can be similarly controlled in electronic device such as laptop computers, digital still cameras, and other electronic devices where power consumption is critical" should read --The backlight can be similarly controlled in electronic devices such as laptop computers, digital still cameras, and other electronic devices where power consumption is critical--.

Column 6, lines 57-58, "the system 900 is a device, such a digital camera" should read --the system 900 is a device, such as a digital camera--.

Signed and Sealed this

Twentieth Day of July, 2010

David J. Kappos
*Director of the United States Patent and Trademark Office*